April 21, 1925.  R. O. COULOMBE  1,534,840

VEHICLE WHEEL

Filed May 10, 1924

Inventor
Romeo O. Coulombe
by Seymour Pearce
atty

Patented Apr. 21, 1925.

1,534,840

UNITED STATES PATENT OFFICE.

ROMEO O. COULOMBE, OF NEW HAVEN, CONNECTICUT.

VEHICLE WHEEL.

Application filed May 10, 1924. Serial No. 712,259.

*To all whom it may concern:*

Be it known that I, ROMEO O. COULOMBE, a citizen of the United States, residing at New Haven, in the county of New Haven and State of Connecticut, have invented a new and useful Improvement in Vehicle Wheels; and I do hereby declare the following, when taken in connection with the accompanying drawings and the characters of reference marked thereon, to be a full, clear, and exact description of the same, and which said drawings constitute part of this application, and represent, in—

Figure 1:
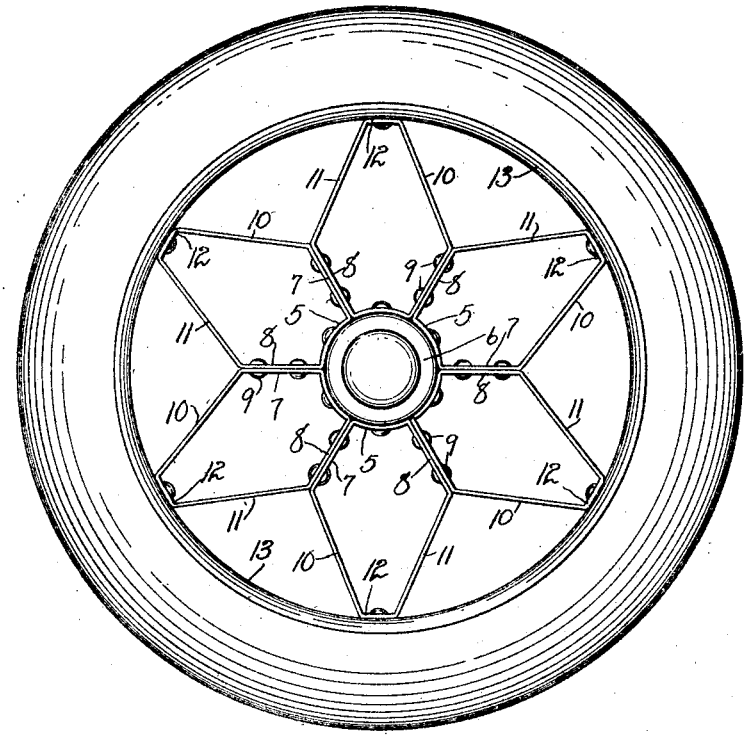

Fig. 1 a side view of a vehicle wheel constructed in accordance with my invention.

Figure 2:
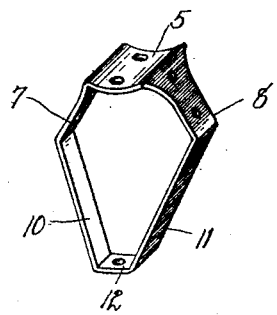

Fig. 2 a perspective view of one of the spokes detached.

This invention relates to improvements in vehicle wheels and particularly to vehicle wheels having metal spokes, and of the general type commonly referred to as "spring wheels". While it is desirable to have more or less spring in the spokes of wheels, the enormous strain to which they are exposed necessitates that they shall be made very strong, and the object of this invention is to form a metal-spoke wheel with the spokes so arranged that while a certain amount of spring is secured, the wheel will be sufficiently rigid to withstand the strain imposed upon it, and the invention consists in the construction as hereinafter described and particularly recited in the claims.

In carrying out my invention, I form the spokes from a single piece of metal by drawing or otherwise, and each spoke consists of a hub-section 5 adapted to be riveted to a hub 6, and from the hub-section are radial arms 7 and 8, preferably narrower than the hub-section and adapted to be secured by rivets 9 with the next adjacent section. Beyond the point of rivets, the spokes have tangential sections 10 and 11 which extend toward each other and are connected at their outer ends by a rim-section 12, which is riveted to a wheel-rim 13.

The sections 7 and 8, being riveted together, form a series of radial spokes, while the tangential sections 10 and 11 form a series of tangential spokes, the radial spokes giving the necessary rigidity, while the tangential sections permit of necessary spring action. In a full size wheel, the ends of the rivets will not show, the drawing being exaggerated in this respect for the purpose of illustration. A wheel thus constructed will be sufficiently rigid to withstand the strain imposed upon it in use, and will also provide a sufficient amount of spring action to equalize shock, and the spokes, being connected, form practically a one-piece wheel.

I claim:

1. A vehicle wheel having a series of metal spokes, each spoke comprising a hub-section, radial sections extending outward therefrom and tangential sections extending outward from the radial sections and inclined toward each other, the tangential sections being connected by a rim-section.

2. A vehicle wheel comprising a hub, a series of metal spokes, each spoke comprising a hub-section riveted to the hub, radial sections extending outward from the hub-section and riveted to the adjacent radial sections, tangential sections extending outward from the radial sections and inclined toward each other and connected together by a rim-section, and a rim riveted to said rim-sections.

In testimony whereof, I have signed this specification in the presence of two subscribing witnesses.

ROMEO O. COULOMBE.

Witnesses:
FREDERIC C. EARLE,
MALCOLM P. NICHOLS.